Oct. 9, 1956         J. D. KEVORKIAN         2,765,771
                    BIRD CAGE CONSTRUCTION
Filed April 27, 1955                        2 Sheets-Sheet 1

INVENTOR.
JOSEPH D. KEVORKIAN
BY
ATTORNEY.

Oct. 9, 1956    J. D. KEVORKIAN    2,765,771
BIRD CAGE CONSTRUCTION
Filed April 27, 1955    2 Sheets-Sheet 2
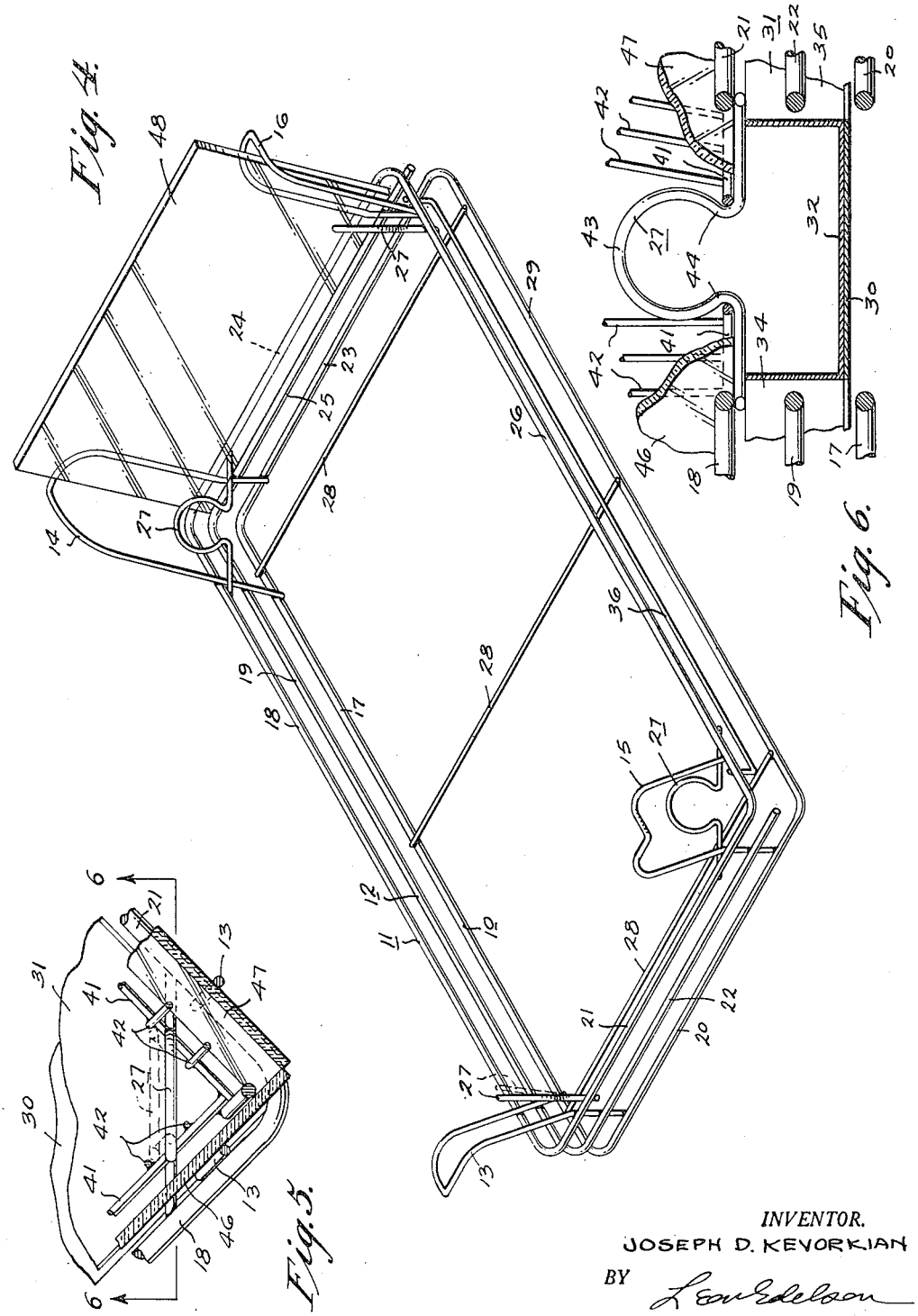
INVENTOR.
JOSEPH D. KEVORKIAN
BY Lou Edelson
ATTORNEY.

United States Patent Office 2,765,771
Patented Oct. 9, 1956

2,765,771

BIRD CAGE CONSTRUCTION

Joseph D. Kevorkian, Lansdowne, Pa.

Application April 27, 1955, Serial No. 504,155

10 Claims. (Cl. 119—17)

This invention relates generally to devices for confining live birds or animals and particularly to open frame work cages for small birds.

A principal object of the present invention is to provide such a cage with an improved construction for the corners of the cage to facilitate the mounting of shields in position to guard against spillage from the cage.

Another important object of the present invention is to provide the corners of such a cage with members that not only maintain the shields in place but additionally secure certain of the several elements of the floor structure together, forming thereof a rigid subassembly.

And another important object of the present invention is to provide the subassembly aforesaid with members that not only carry the shield members and the open framework of the cage but additionally interlock detachably with the latter.

Other objects and advantages of the present invention will appear more fully hereinafter, it being understood that the invention consists substantially in the combination, construction, location and relative arrangement of parts, all as described in detail hereinafter, as shown in the accompanying drawings and as finally pointed out in the appended claims.

In the accompanying drawings, which illustrate an enclosure constructed in accordance with and embodying the general principles of the present invention:

Figure 4 is an enlarged perspective view showing a shield mounted upon the rigid subassembly of the floor structure;

Figure 5 is an enlarged section on line 5—5 of Figure 2; and

Figure 6 is a section on line 6—6 of Figure 5.

Figure 1:
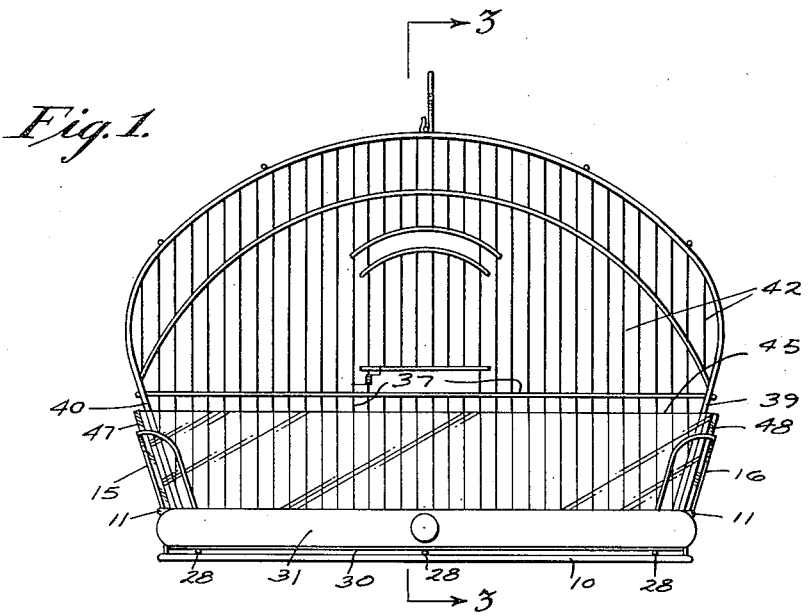
Figure 1 is a front elevation of a bird cage embodying the present invention.
Figures 2, 3:
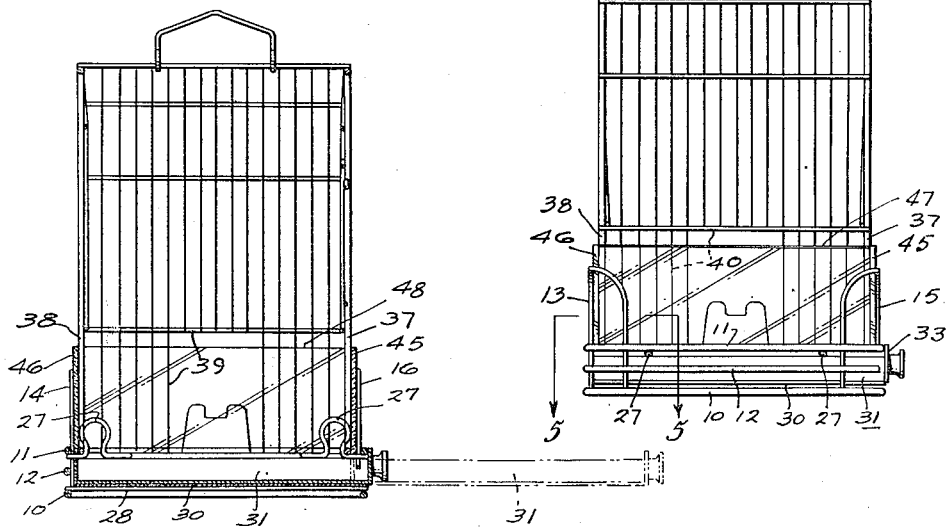
Figure 2 is a side elevation of the bird cage shown in Figure 1.
Figure 3 is a section on line 3—3 of Figure 1.

Referring particularly to Figure 4, the floor structure or member preferably but not necessarily comprises a subassembly that is rectangular in shape and made entirely of suitably heavy wire stock. This subassembly includes a set of elements, designated 10, 11, and 12, that extend about its periphery, being disposed respectively in vertically spaced parallel planes. The elements 10 and 11 are identical and extend continuously about all four sides of the assembly, while the element 12 extends continuously about the rear and opposite ends only. Corresponding sides of the elements 10, 11 and 12 are disposed in vertical registry.

For securing the elements 10, 11 and 12 together to form thereof a rim for the subassembly, the corners of the subassembly are provided with members that are of inverted U shaped, those at the rear being designated 13 and 14 and those at the front being designated 15 and 16. The opposite end portions of the members 13 and 14 are disposed inside the elements 10, 11 and 12, one end portion of each abutting the sides of the elements 10, 11 and 12 extending along the rear of the assembly, respectively designated 17, 18 and 19, the other end portion of the member 13 abutting the sides of the elements 10, 11 and 12 extending along one end of the assembly, respectively designated 20, 21 and 22, and the other end portion of the member 14 abutting the sides of the elements 10, 11 and 12 extending along the opposite end of the assembly, respectively designated 23, 24 and 25. The opposite end portions of the members 15 and 16 are likewise disposed inside the elements 10, 11 and 12, one end portion of each abutting the side of the element 11 extending along the front of the assembly, designated 26, the other end portion of the member 15 abutting the sides of the elements 10, 11 and 12 respectively designated 20, 21 and 22, and the other end portion of the member 16 abutting the sides of the elements 10, 11 and 12 respectively designated 23, 24 and 25.

The corners of the assembly are additionally provided with diagonally extending members designated 27 disposed respectively on the inner sides of the members 13, 14, 15 and 16, in spaced relation thereto. The opposite end portions of the members 27 each abut the undersurface of the associated side of the element 11.

Extending from front to rear of the subassembly are a number of laterally spaced members, designated 28. Corresponding front end portions of the members 28 rest upon the side of the element 10 extending along the front of the assembly, designated 29, and corresponding rear end portions of the members 28 rest upon the side of the element 10 extending along the rear of the assembly, designated 17. It will be understood, of course, that the peripherally extending elements 10 through 12 and the members 13 through 16 at the four corners of the assembly, the several members 27 likewise at the four corners of the assembly and the several members 28 are welded together to make the subassembly rigid.

Overlying the several members 28 is a rectangular plate member designated 30 the rear corners of which extend respectively well back between the opposite end portions of the members 13 and 14. Overlying the plate member 30 is a rectangular tray designated 31 provided with a flat bottom 32 and raised side walls, the front and rear walls being respectively designated 33 and 34 and the opposite end walls being designated 35—35. The rear corners of the tray 31 likewise extend respectively well back between the opposite end portions of the members 13 and 14, under the associated members 27—27. The front wall 33 of the tray is somewhat higher than the rear wall 34 and the opposite end walls 35—35 so that normally the longitudinally extending upper marginal portion thereof abuts the front of the side of the element 11 designated 26. Depending from the latter is an element designated 36 that extends into the tray 31, provided for a purpose that will appear hereinafter.

For covering the floor structure or member, an open framework is provided comprising upright side walls, the front and rear walls, designated 37 and 38, being vertical, and the opposite end walls, designated 39 and 40, being sloped, as shown. This open framework is conventionally provided with suitably heavy widely spaced wire stock members including a rectangular element 41 extending about the base thereof and additionally with numerous comparatively light closely spaced wire stock members 42 extending upwardly from the element 41.

The open framework is carried by the several members 27, the element 41 being seated directly upon the opposite end portions of the several members 27. The members 27 are each provided with a rounded intermediate head portion 43 that extends upwardly into the open framework, the opposite sides of the head portion 43 being freely received respectively between pairs of the members 42 and being joined respectively to the opposite end portions of the member 27 by reversely curved portions 44—44, in which portions of the element 41 nest, in consequence of which the several members 27 not only carry the open framework but detachably interlock therewith and coact to secure the same against horizontal shifting movement relative to the floor member.

Exteriorly of the open framework, on each side thereof, is a shield in the form of a rectangular member preferably but not necessarily of transparent material such as glass or plastic. The shields at the front and rear, designated 45 and 46, are positioned upright parallel to and respectively closely adjacent the walls 37 and 38 of the open framework, while the shields at the opposite ends, designated 47 and 48, are positioned upright parallel to and respectively closely adjacent the walls 39 and 40 of the open framework. The shields 45 through 48 likewise are carried by the several members 27, the opposite end portions of each being seated respectively upon the associated end portions of the members 27—27.

For maintaining the shields 45 through 48 in the upright positions aforesaid, the members 13 through 16 extend above the element 11 of the floor member subassembly on the outer sides of the shields in contact therewith. The closed ends of these members 13 through 16 each arch around the associated ends of the shields, being bent more or less sharply so that major portions of the member on opposite sides of the bend are disposed in planes that are respectively spaced from and parallel to the associated side walls of the open framework. It will be observed that the members 13 through 16 not only stay movement of the shields away from the side walls of the open framework, but likewise stay endwise displacement thereof. When mounted in the manner aforesaid, the shields are disposed in vertical continuation of the side walls of the tray 31, in consequence of which they coact with these side walls to guard against spillage from the cage. The shields may be removed by raising the same each parallel to the associated side wall of the open framework.

It likewise will be observed that the open framework may be conveniently detached from the floor member by merely raising one end of the open framework while securing the floor member against movement therewith. When this is done, at each corner at the end of the cage where the open framework is raised the portions of the element 41 nested in the reversely curved portions 44—44 of the member 27 are initially forced upwardly along the opposite sides of the rounded head 43 of the member 27 in contact therewith, forcing the head to twist about the opposite end portions of the member 27 to an inwardly inclined position (see dotted line showing in Figures 4 and 5). As the open framework is raised further, both ends thereof separate freely from the floor member, and the rounded beads of the members 27—27 spring back to their initial positions. In order to replace the open framework the foregoing procedure is reversed. One end of the open framework and particularly of the element 41 is seated upon the associated ends of the members 27—27, while the opposite end of the open framework and particularly of the element 41 is rested upon the rounded heads 43 of the associated members 27—27. Then the latter end of the open framework is forced over the rounded heads of the underlying members 27—27, whereupon these heads twist about their opposite end portions and incline inwardly sufficiently to allow the element 41 to pass thereby to its initial position nested in the reversely curved portions of the rounded heads. As the element 41 approaches its initial position, the rounded heads spring back to their initial positions, and the open framework is once again detachably interlocked with the floor member at all four corners of the cage.

The several members 27 do not interfere in any way with movement of the tray 31, which may be pulled out until the rear wall 34 thereof strikes the element 36 depending from the element 11, and which may then be removed altogether by raising the front of the tray 31 so that the rear wall 34 of the tray can pass under the element 36.

It will be understood, of course, that the present invention as hereinbefore described and as shown in the accompanying drawings is susceptible of various changes and modifications which may be made from time to time without departing from the general principles or real spirit of the invention, and accordingly, it is intended to claim the same broadly, as well as specifically, as indicated by the appended claims.

What is claimed as new and useful is:

1. In a bird or animal cage, in combination, a floor member, means having open framework side walls upright upon said floor member and enclosing an area thereof, stay means extending upwardly from said floor member outside of said side walls each along a corner where an open framework side wall is joined with one of its contiguous side walls and extending horizontally around said corner, means rigidly secured to a raised rim portion of said floor member and extending diagonally across said corner, and shield members supported upon said diagonally extending means and removably fitted between said open framework side walls and stay means and maintained by the latter upright upon said diagonally extending means closely adjacent said open framework side walls and against endwise displacement.

2. In a bird or animal cage as defined in claim 1 wherein the diagonally extending shield supporting means likewise supports the upright side walls of said floor enclosing means and is detachably interlocked therewith.

3. In a bird or animal cage as defined in claim 1 wherein the shield means and the upright side walls of said floor enclosing means are commonly seated upon the diagonally extending shield supporting means, and the latter is provided with means extending upwardly into said floor enclosing means and detachably interlocked with the upright side walls thereof.

4. In a bird or animal cage as defined in claim 1 wherein the floor member is fitted with a removable tray having raised side walls, and the shield supporting means extends diagonally across a corner of said tray above the side walls thereof.

5. In a bird or animal cage, in combination, a floor member, means having open framework sidewalls upright upon said floor member and enclosing an area thereof, means anchored to said floor member and extending upwardly therefrom into the interior of said open framework and spaced along said upright sidewalls to secure said open framework against horizontal shifting movement relative to said floor member, each of said anchored means being provided with an enlarged head opposite side portions of which project outwardly in opposite directions respectively into openings in said upright side walls, the portions of said side walls underlying said openings being nested under and interlocked with said heads to secure said framework to said floor member, said side walls and heads being relatively yieldable for separation of said open framework from said floor member.

6. In a bird or animal cage as defined in claim 5 wherein the anchored means are each disposed in a plane extending diagonally across a corner where a pair of the open framework sidewalls are joined, and each opposite side portion of the head of each anchored means projects outwardly into the opening in the associated upright side wall.

7. In a bird or animal cage as defined in claim 5 wherein the anchored means are secured to a raised rim portion of said floor member, each anchored means is disposed in a plane extending diagonally across a corner where a pair of the open framework side walls are joined, the head of each anchored means is rounded and each of its opposite side portions are projected outwardly into the opening in the associated upright side wall.

8. In a bird or animal cage as defined in claim 5 wherein the floor member is provided with a raised rim portion, the open framework is provided with an elongated base element extending around the lower end thereof, said anchored means are each disposed in a plane extending diagonally across a corner where a pair of the open framework side walls are joined, each anchored means is a one-piece elongated member having a head portion extending through an arc in excess of 180° and joined by reversely curved portions respectively to oppositely extending opposite end portions, the latter being respectively secured to said raised rim portion of said floor member, portions of said base element are nested respectively in the several reversely curved portions aforesaid and the opposite side portions of the several heads are projected each through an upright side wall of said open framework, being disposed thereby in overlying relation to the associated portion of said base element nested in the manner aforesaid.

9. In a bird or animal cage, in combination, a floor member having a plurality of peripherally horizontally extending elements disposed in vertically spaced relation one directly over the other, means having open framework side walls upright upon said floor member and enclosing an area thereof, stay means respectively at the corners where the open framework side walls are jointed, said stay means being each of inverted U-shape with opposite side portions respectively disposed in angularly related planes each of which is disposed in outer spaced relation to the associated upright side wall of the floor enclosing means, the base portions of the stay means being extended along and rigidly secured to the inner sides of said floor elements to maintain the same in the spaced relation aforesaid and shield members removably fitted between said open framework side walls and stay means and maintained by the latter upright upon said floor member closely adjacent said open framework side walls and against endwise displacement.

10. In a bird or animal cage as defined in claim 9 wherein the opposite side portions of each stay means extend upwardly from said floor member each parallel to the associated upright side wall of the floor enclosing means and arch around the corner formed by said upright side walls.

References Cited in the file of this patent

UNITED STATES PATENTS

| Number | Name | Date |
|---|---|---|
| 85,523 | Gunther | Jan. 5, 1869 |
| 2,178,117 | Hillenek | Oct. 31, 1939 |